UNITED STATES PATENT OFFICE.

THEODORE A. HOFFMANN, OF BEARDSTOWN, ILLINOIS.

IMPROVEMENT IN THE MANUFACTURE OF DEXTRINE AND SUGAR.

Specification forming part of Letters Patent No. 20,347, dated May 25, 1858.

*To all whom it may concern:*

Be it known that I, THEODORE A. HOFFMANN, of the city of Beardstown, in the county of Cass, in the State of Illinois, have discovered a new improvement in the *modus operandi* for making dextrine and sugar from Indian corn or other grain; and I do hereby declare that the following is an exact description.

The application of acids for converting starch into gum and sugar has been known and understood many years, and also that with the common or usual method of boiling at 212° Fahrenheit the greater the quantity of acid used the quicker would be the conversion of the starch. The application of acid directly on cereals has also been tried, but has hitherto been considered impracticable in a technical or manufacturing view.

Now, the nature of my improvement consists in the application of steam-diluted acids and water at a higher temperature than the boiling-point—namely, at a temperature of 225° to 300° Fahrenheit, or one and a half to four atmospheric pressures—for converting starch, corn, or other grain into dextrine or grape-sugar.

My method of procedure is as follows: The mash-tun, (which must be a similar one to those used in distilleries, omitting the lining of copper or iron,) must be so constructed as to bear the extreme pressure caused by raising the boiling mass to 250° or 300° Fahrenheit. It must be made of wooden staves of proportional strength of from four to six inches in thickness and iron hooped, with top and bottom of the same strength as the sides, and fitted in tight, similar to a still in a distillery. The diameter of the mash-tun should be the same as its height—say eight by eight feet or ten by ten feet—according to the quantity of grain used in one mash. The top is provided with a man-hole for the purpose of adding the grain or for cleaning out the tun, and also with a safety-valve and either a manometer or a thermometer.

The steam or feed pipe for conveying the steam from the steam-boiler into the tun is made of iron, and may be inserted through the bottom of the tun in the center of the radius and project inside for three or four inches, or so far as not to interfere with the stirring apparatus. The pipe may be lined and covered with sheet-lead so far as it is likely to be acted upon by the acidulated liquid; but this is not essentially necessary; or a similar feed-pipe may be inserted into the tun on the side about six inches above the bottom.

The shaft to the stirrer is carried through the center of the bottom of the tun and works in an iron sleeve, which is fastened to the bottom of the tun by a flange. This sleeve may also be covered with sheet-lead in order to avoid the action of the acid on the iron. The opening for the shaft in the bottom of the tun is secured outside by a stuffing-box to prevent the escape of steam. If the arrangement of the machinery requires it, the stirrer-shaft may be inserted through the top instead of the bottom of the tun, in which case, of course, the stuffing-box would also be on the top.

On the bottom of the tun is a slide for emptying it, fitted up similarly to those in use in distilleries, only faced with lead.

To every bushel of grain I use about twelve gallons of water, heated by steam to the boiling-point. I then add, in proportion to the pressure of steam I can apply, one to two per cent. (of the weight of corn used) of sulphuric acid of 1.840 specific gravity or 65° Baumé, or, what is more economical and profitable to the manufacturer, the diluted acid known as "chamber-acid," used in proportionate quantities. I then add to the boiling mixture of water and acid the ground corn or other cereal gradually, and in such quantities as will not cause the mash to form a thick paste, the same being kept in motion with the usual stirring apparatus. When the whole of the grain is added the mash-tun is closed, the heat and pressure raised as before described, and the mash kept in motion from two to three hours, when the starch in the grain is converted into dextrine. In order to ascertain the precise period to stop boiling, I apply to a small portion—say a table-spoonful—of the mash a few drops of the solution of iodine in alcohol, and when the iodine no longer produces a bluish color the process for making dextrine is complete.

If the object is to manufacture dextrine starch-gum for technical purposes, the application of steam is withdrawn at this stage of the process, and immediately, while the mash is still hot, I saturate the acid either with marble-dust, chalk, whiting, or slaked lime, mixed with water to a cream-like consistency, while the mash is kept in motion by the stirrer. A sufficiency of the alkaline mixture is known to be added when it is found that the litmus paper dipped into the mash ceases to turn red. (A surplus of lime or marble-dust will give to the whole a yellowish color and a peculiar smell.) The mash may then stand an hour to settle, and when strained and pressed the clear liquor, which will run off, contains the gum and some gluten in solution, which may be used in that state or concentrated by evaporation.

For the manufacture of alcohol the process of steaming, as before described, is continued, (instead of being discontinued, as for the manufacture of gum,) and should be continued about one hour longer, or until the mash has become sweet and the sugar formed. The steaming process is then stopped and the acid saturated, and the whole tested with litmus-paper, as before described. The mash is then cooled with water to 70° or 75° Fahrenheit, according to the season, and then fermented by yeast, and distilled in the usual way. The residue from the still does not contain sufficient nourishment for hogs, but forms a most excellent manure.

I disclaim the separate action of steam and acids for converting starch, corn, or other grain into dextrine or sugar and alcohol therefrom by the usual boiling-point of one atmospherical pressure; but What I do claim as my improvement is—

The combination of steam and acids for converting starch, corn, or other cereals into dextrine, gum, or sugar when said grain is subjected to the action of diluted acids and the temperature of the mass is elevated to 225° or 300° Fahrenheit.

THEODORE A. HOFFMANN.

Attest:
H. E. DUMMER,
JAS. McCLURE.